US008648838B2

(12) United States Patent
Miyazawa et al.

(10) Patent No.: US 8,648,838 B2
(45) Date of Patent: Feb. 11, 2014

(54) INFORMATION PROCESSING APPARATUS, INFORMATION PROCESSING METHOD, AND PROGRAM

(75) Inventors: Yusuke Miyazawa, Tokyo (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 427 days.

(21) Appl. No.: 12/862,099

(22) Filed: Aug. 24, 2010

(65) Prior Publication Data

US 2011/0050653 A1 Mar. 3, 2011

(30) Foreign Application Priority Data

Aug. 31, 2009 (JP) ................ P2009-200871

(51) Int. Cl.
*G06F 3/033* (2013.01)

(52) U.S. Cl.
USPC .......................................... 345/179

(58) Field of Classification Search
USPC ............... 345/173–179; 178/18.01–18.11
See application file for complete search history.

(56) References Cited

U.S. PATENT DOCUMENTS

| 7,629,966 | B2 * | 12/2009 | Anson ............................ 345/173 |
| 7,710,397 | B2 * | 5/2010 | Krah et al. .................... 345/163 |
| 2004/0155901 | A1 * | 8/2004 | McKee et al. ................. 345/747 |
| 2006/0001654 | A1 * | 1/2006 | Smits ............................ 345/176 |
| 2006/0084482 | A1 * | 4/2006 | Saila ......................... 455/575.1 |
| 2006/0247026 | A1 * | 11/2006 | Walker et al. .................. 463/25 |
| 2007/0139386 | A1 * | 6/2007 | Martin et al. ................. 345/173 |
| 2009/0046110 | A1 * | 2/2009 | Sadler et al. ................. 345/660 |

FOREIGN PATENT DOCUMENTS

JP 2008-192092 8/2008

* cited by examiner

*Primary Examiner* — Kent Chang
*Assistant Examiner* — Nathan Brittingham
(74) *Attorney, Agent, or Firm* — Sherr & Jiang, PLLC

(57) ABSTRACT

There is provided an information processing apparatus including a detection section which detects touch operation on a touch operation surface by the operating tool, an execution section which executes predetermined processing designated by the touch operation, a determination section which determines whether contact of the operating tool to the touch operation surface is maintained, and a display control section which causes a confirmation message for confirming whether to execute the predetermined processing to be displayed depending on a determination result of the determination section, and, when the determination section determines that the contact of the operating tool to the touch operation surface is maintained, the execution section executes the predetermined processing designated by the touch operation even without explicit confirmation processing being performed with respect to the confirmation message.

14 Claims, 9 Drawing Sheets

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and a program.

2. Description of the Related Art

In a display device, there is a touch screen (touch panel) provided with an electrostatic capacity-type or resistive film-type touch sensor on a surface of a display section of a liquid crystal display or the like. With the touch screen, it becomes possible to perform input operation to an information processing apparatus, and a user comes to be able to handle easily the information processing apparatus.

Recently there has been disclosed a technology for improving usability for a user when performing input using a touch screen (for example, Japanese Patent Application Laid-Open No. 2008-192092). In Japanese Patent Application Laid-Open No. 2008-192092, a pressing force applied by an operating tool which comes in contact with the touch screen is detected, and the detected pressure data is associated with processing related to operation such as cursor movement or double click. Accordingly, in the information processing apparatus including the touch screen, the number of types of processing related to the operation can be increased.

SUMMARY OF THE INVENTION

Recently, with the increase in performance of a mobile information terminal, it has become possible to comfortably view a Web page and to manage a large amount of data. When the function of such product is improved, it is necessary to display warnings to various operations. For example, in the case of performing irreversible operation such as data deletion and in the case of accessing an unreliable Web site, the mobile information terminal displays a message to warn the user. In the case of deleting a file in the mobile information terminal, the mobile information terminal makes sure to perform safe operation by asking for permission to perform the deletion operation or by dividing the a step of the deletion operation into multiple steps. However, in the case of deleting multiple files, it was necessary to perform multiple steps for deleting a file for each of the multiple files.

In the case of accessing an unreliable Web site, a security certificate held by the Web site (SSL certificate, hereinafter may be simply referred to as "certificate") is necessitated, and hence, it is usually necessary to add the certificate to a browser. In the case where the certificate is not added to the browser, the permission is requested every time accessing the Web site. However, there were some cases where it was difficult to add the certificate to a browser of the mobile information terminal.

In light of the foregoing, it is desirable to provide a novel and improved information processing apparatus, information processing method, and program, which are capable of executing predetermined processing even without explicit confirmation processing being performed with respect to a confirmation message.

According to an embodiment of the present invention, there is provided an information processing apparatus which includes a detection section which detects touch operation on a touch operation surface by the operating tool, an execution section which executes predetermined processing designated by the touch operation, a determination section which determines whether contact of the operating tool to the touch operation surface is maintained, and a display control section which causes a confirmation message for confirming whether to execute the predetermined processing to be displayed depending on a determination result of the determination section, and, when the determination section determines that the contact of the operating tool to the touch operation surface is maintained, the execution section executes the predetermined processing designated by the touch operation even without explicit confirmation processing being performed with respect to the confirmation message.

Further, the detection section may detect a pressing force applied by the operating tool to the touch operation surface. The determination section may determine whether the contact of the operating tool to the touch operation surface is maintained and whether the pressing force applied by the operating tool to the touch operation surface increases. When the determination section determines that the contact of the operating tool to the touch operation surface is maintained and that the pressing force applied by the operating tool to the touch operation surface increases, the execution section may execute the predetermined processing designated by the touch operation even without explicit confirmation processing being performed with respect to the confirmation message.

Further, when the determination section determines that the contact of the operating tool to the touch operation surface is maintained and that the pressing force applied by the operating tool to the touch operation surface becomes equal to or more than a predetermined threshold value, the display control section may cause a confirmation message depending on the pressing force to be displayed.

Further, the determination section may determine whether a predetermined time period is elapsed from the display of the confirmation message performed by the display control section. When the determination section determines that the predetermined time period is elapsed from the display of the confirmation message, that the contact of the operating tool to the touch operation surface is maintained, and that the pressing force applied by the operating tool to the touch operation surface becomes equal to or more than a predetermined threshold value, the execution section may execute the predetermined processing designated by the touch operation.

Further, the information processing apparatus may further include a recording section which, when confirmation processing with respect to the confirmation message is executed in accordance with the operation of the operating tool, records the confirmation processing. When the confirmation message is displayed by the display control section, the determination section may determine whether the confirmation processing with respect to the confirmation message is recorded. When the determination section determines that the confirmation processing with respect to the confirmation message is recorded, the execution section may execute the predetermined processing designated by the touch operation even without explicit confirmation processing being performed with respect to the confirmation message.

Further, the display control section may cause a plurality of confirmation messages to be displayed on a display screen in a step-by-step manner before the predetermined processing is executed by the execution section, and, when the determination section determines that the contact of the operating tool to the touch operation surface is maintained and that the pressing force applied by the operating tool to the touch operation surface increases and becomes equal to or more than a predetermined threshold value, may cause the plurality of confirmation messages to be displayed on the display screen depending on the pressing force even without explicit confirmation processing being performed with respect to the confirmation message.

Further, after the plurality of confirmation messages are sequentially displayed by the display control section, the execution section may execute the predetermined processing designated by the touch operation even without explicit confirmation processing being performed with respect to the confirmation message.

Further, before the execution section executes the predetermined processing, the display control section may cause a final confirmation message of whether to execute the predetermined processing to be displayed. After the final confirmation message is displayed, the execution section may execute the predetermined processing designated by the touch operation depending on the pressing force applied by the operating tool.

Further, the display control section may change display forms including a display color and a display size of the confirmation message depending on the pressing force applied by the operating tool.

Further, the execution section may execute output processing including an audio output and a vibration output along with the display of the confirmation message performed by the display control section, depending on the pressing force applied by the operating tool.

According to another embodiment of the present invention, there is provided an information processing method which includes the steps of detecting touch operation on a touch operation surface by the operating tool, determining whether contact of the operating tool to the touch operation surface is maintained, causing a confirmation message for confirming whether to execute predetermined processing to be displayed, and executing, when it is determined that the contact of the operating tool to the touch operation surface is maintained, the predetermined processing designated by the touch operation even without explicit confirmation processing being performed with respect to the confirmation message.

According to another embodiment of the present invention, there is provided a program for causing a computer to function as an information processing apparatus which includes a detection section which detects touch operation on a touch operation surface by the operating tool, an execution section which executes predetermined processing designated by the touch operation, a determination section which determines whether contact of the operating tool to the touch operation surface is maintained, and a display control section which causes a confirmation message for confirming whether to execute the predetermined processing to be displayed depending on a determination result of the determination section, and, when the determination section determines that the contact of the operating tool to the touch operation surface is maintained, the execution section executes the predetermined processing designated by the touch operation even without explicit confirmation processing being performed with respect to the confirmation message.

According to the embodiments of the present invention described above, predetermined processing can be executed even without explicit confirmation processing being performed with respect to a confirmation message.

DETAILED DESCRIPTION OF THE EMBODIMENTS

Figure 1:
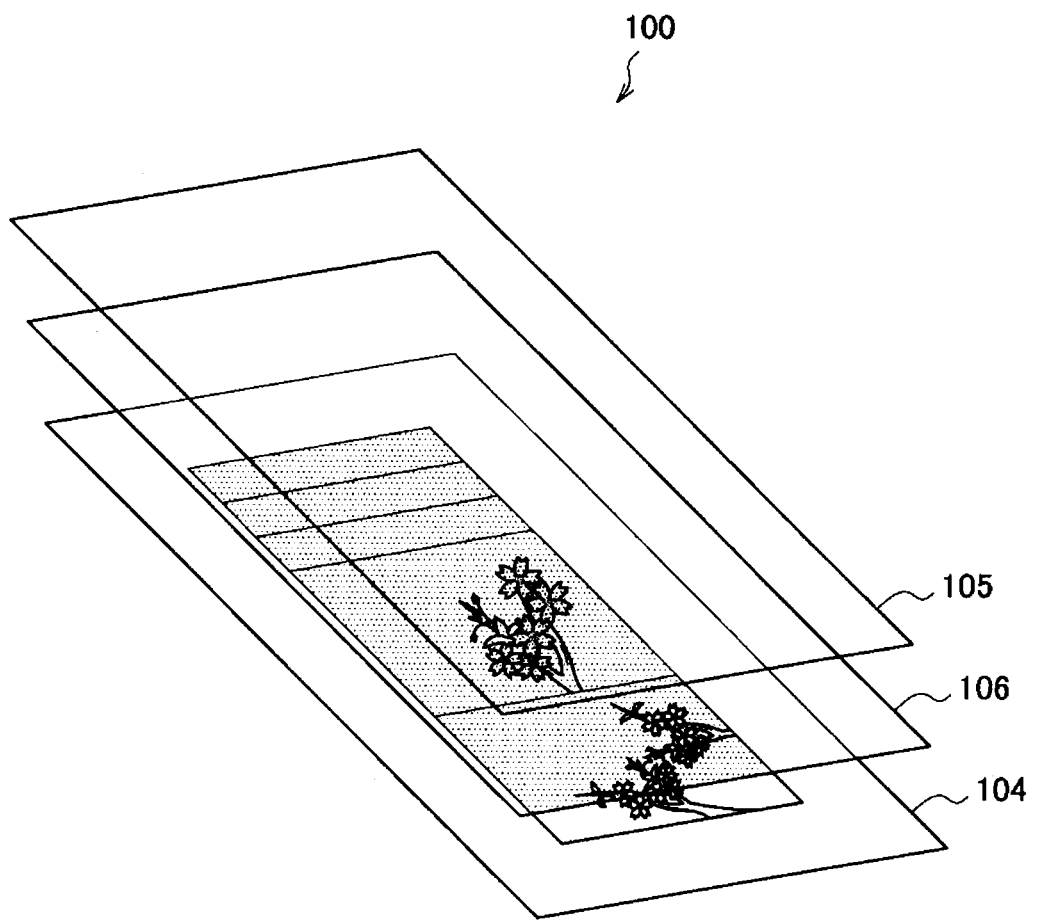
FIG. 1 is an explanatory view showing a configuration of a display device of an information processing apparatus according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Further, the "preferred embodiment of the present invention" will be described in the following order.
[1] Object of present embodiment
[2] Hardware configuration of information processing apparatus
[3] Functional configuration of information processing apparatus
[4] Detail of operation of information processing apparatus
[1] Object of Present Embodiment First, an object of the present embodiment will be described. In a display device, there is a touch screen (touch panel) provided with an electrostatic capacity-type or resistive film-type touch sensor on a surface of a display section of a liquid crystal display or the like. With the touch screen, it becomes possible to perform input operation to an information processing apparatus, and a user comes to be able to handle easily the information processing apparatus.

Recently there has been disclosed a technology for improving usability for a user when performing input using a touch screen. In the technology, a pressing force applied by an operating tool which comes in contact with the touch screen is detected, and the detected pressure data is associated with processing related to operation such as cursor movement or double click. Accordingly, in the information processing apparatus including the touch screen, the number of types of processing related to the operation can be increased.

Recently, with the increase in performance of a mobile information terminal, it has become possible to comfortably view a Web page and to manage a large amount of data. When the function of such product is improved, it is necessary to display warnings to various operations. For example, in the case of performing irreversible operation such as data deletion and in the case of accessing an unreliable Web site, the mobile information terminal displays a message to warn the user.

Figure 9:
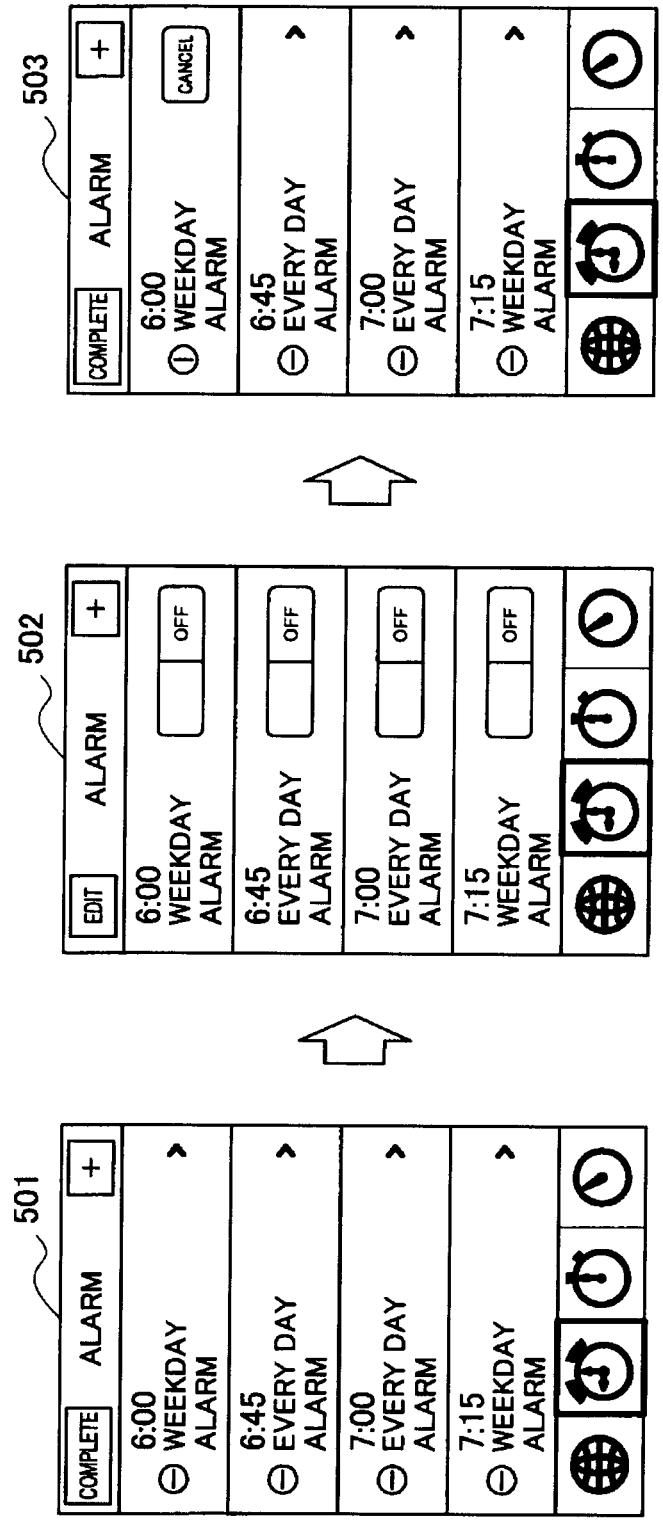
FIG. 9 is an explanatory view illustrating display control processing in related art.

In the case of deleting a file in the mobile information terminal, the mobile information terminal makes sure to perform safe operation by asking for permission to perform the deletion operation or by dividing the a step of the deletion operation into multiple steps. For example, as shown in FIG. 9, in the case of deleting data such as alarm which is set by the user, a list of data is displayed as shown in a display example 501, and after that there is displayed, as shown in a display example 502, an "OFF" button for each data for deleting the data by touch operation of the user or the like. Then, in the case where the "OFF" button is touched by the user, "delete" for deleting the data is displayed as shown in a display example 503. In addition, depending on circumstances, a message for requesting permission to perform the deletion operation is displayed and in the case where confirmation processing is executed, the data is deleted.

In the case of accessing an unreliable Web site, a security certificate held by the Web site (SSL certificate, hereinafter, may be simply referred to as "certificate") is necessitated, and hence, it is usually necessary to add the certificate to a browser. In the case where the certificate is not added to the browser, the permission is requested every time accessing the Web site. However, there were some cases where it was difficult to add the certificate to a browser of the mobile information terminal.

Figure 10:
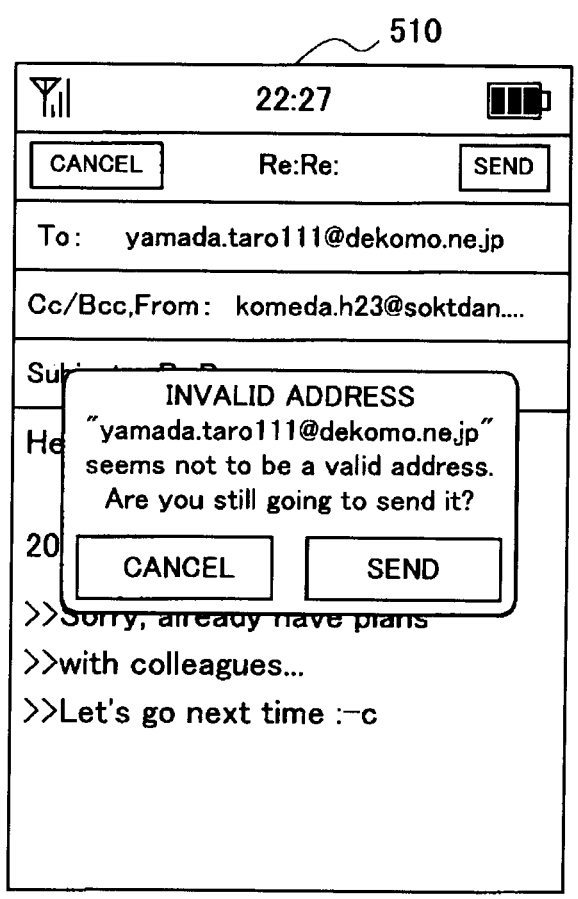
FIG. 10 is an explanatory view illustrating display control processing in related art.

For example, as shown in FIG. 10, in the case where a warning message is displayed indicating that the mail address is invalid, the user selects "send" and sends the mail. Even when the user knows that the mail address is valid, there is a case where the warning message is displayed every time the user sends a message. When the warning message is displayed in the case where the user knows that the mail address is valid, unnecessary processing occurs and the operability is lowered.

In light of the foregoing, an information processing apparatus 100 according to the present embodiment of the present invention is produced. According to the information processing apparatus 100 of the present embodiment, it becomes possible to execute predetermined processing even without explicit confirmation processing being performed with respect to a confirmation message.

The present embodiment will be described by taking, as examples of the information processing apparatus 100, a compact audio player or media player, a PDA (personal digital assistant), and a mobile phone as shown in FIG. 1, but the examples are not limited thereto, and the information processing apparatus 100 can be applied to a personal computer and the like. Further, the information processing apparatus 100 is configured in an integrated manner with a display device such as a display, but is not limited to such example, and may also be configured as a separate apparatus from the display device.

[2] Hardware Configuration of Information Processing Apparatus

In the above, the object of the present embodiment has been described. Next, with reference to FIG. 1, a hardware configuration of the information processing apparatus 100 according to the present embodiment will be described. FIG. 1 is an explanatory view showing an example of the hardware configuration of the information processing apparatus 100. The information processing apparatus 100 according to the present embodiment is an apparatus which is capable of inputting information by touching and pressing, with an operating tool, a display screen of a display device on which information is displayed. A user who has the information processing apparatus 100 can, by causing the operating tool to touch an object displayed on the display device as an icon, character keys, or the like, select and decide the object touched with the operating tool.

As shown in FIG. 1, an input display section of the information processing apparatus 100 is formed by laminating, on the side of a display screen of a display device 104, a sheet-like pressure-sensitive sensor 106 and a sheet-like electrostatic touch panel 105.

The electrostatic touch panel 105 has a function of detecting contact of the operating tool to the display screen. The electrostatic touch panel 105 includes electrostatic sensors arranged in a lattice-like manner, and a value thereof is continuously changed depending on a change of an electrostatic capacity. In the case where a finger as the operating tool approaches or touches the electrostatic sensor, the electrostatic capacity detected by the electrostatic sensor increases. It is possible to simultaneously acquire the electrostatic capacity of each of the electrostatic sensors. By detecting the electrostatic capacities of all the electrostatic sensors and interpolating therebetween, a shape of the finger approaching or touching the electrostatic sensors can be detected. The electrostatic touch panel 105 outputs the detected value of the electrostatic capacity to a CPU (Central Processing Unit; reference numeral 101 in FIG. 2).

Further, the pressure-sensitive sensor 106 has a function of detecting a pressure which presses the display screen. The pressure-sensitive sensor 106 can form an electrode plane with two sheet panels, for example, and can use a resistive film pressure-sensitive-type sensor which detects a position by detecting the energization at the pressed portion. In the same manner as the electrostatic touch panel 105, the pressure-sensitive sensor 106 has multiple detection points arranged within the sheet which are for detecting a pressed position. It is possible to simultaneously detect the energization at each of the detection points. The pressure-sensitive sensor 106 outputs the pressure which presses the display screen that is detected at each detection point to the CPU.

The CPU correlates various types of information input from the electrostatic touch panel 105 and the pressure-sensitive sensor 106 with a display position of content displayed on the display device 104, and analyzes movement of the operating tool. Then, the CPU recognizes information input to the information processing apparatus 100 from the analyzed movement of the operating tool and executes processing corresponding to the input information. In this way, the user can input information by operating the content displayed on the display screen. Note that, when the operating tool is caused to touch or press the display screen of the display device 104, the operating tool is actually not touching the display screen of the display device 104, but is touching the surface of the electrostatic touch panel 105. In this manner, even when the operating tool is actually touching the surface of the electrostatic touch panel 105, such a case may hereinafter be referred to as "the operating tool is caused to touch the display screen of the display device 104".

Figure 2:
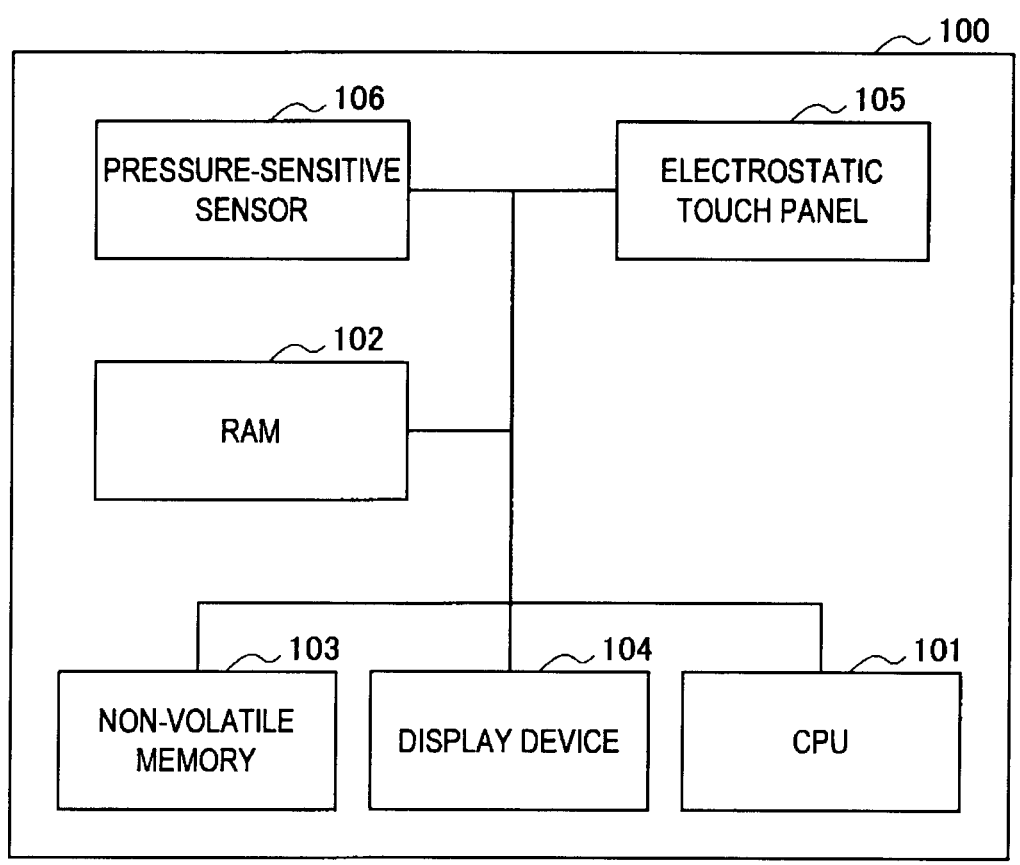
FIG. 2 is an explanatory view illustrating a hardware configuration of the information processing apparatus according to the embodiment.

Next, with reference to FIG. 2, a hardware configuration of the information processing apparatus 100 will be described. As shown in FIG. 2, the information processing apparatus 100 according to the present embodiment includes the CPU 101, a RAM (Random Access Memory) 102, a non-volatile memory 103, the display device 104, the electrostatic touch panel 105, and the pressure-sensitive sensor 106.

As described above, the CPU 101 functions as an arithmetic processing unit and a control unit, and controls an entire operation of the information processing apparatus 100 in accordance with various kinds of programs. Further, the CPU 101 may be a microprocessor. The RAM 102 primarily stores a program which is used in the execution of the CPU 101, a parameter which appropriately changes in the execution, and the like. They are connected to each other via a host bus which includes a CPU bus and the like. The non-volatile memory 103 stores the program, a calculation parameter, and the like which the CPU 101 uses. As the non-volatile memory 103, there can be used a ROM (Read Only Memory), a flash memory, and the like.

The display device 104 is an example of an output device which outputs information. As the display device 104, there can be used, for example, a liquid crystal display (LCD) device and an OLED (Organic Light Emitting Diode) device. The electrostatic touch panel 105 is an example of an input device to which information is input by the user, and includes input means for inputting the information, an input control circuit which generates an input signal and outputs the input signal to the CPU 101 based on the user's input, and the like. Similarly as the electrostatic touch panel 105, the pressure-sensitive sensor 106 is also an example of an input device to which information is input by the user. The electrostatic touch panel 105 and the pressure-sensitive sensor 106 can each have the configuration as described above.

The user can input various kinds of data and instruct processing operation with respect to the information processing apparatus 100 by operating the electrostatic touch panel 105 and the pressure-sensitive sensor 106. In the information processing apparatus 100 according to the present embodiment, the electrostatic touch panel 105 detects touch operation on a touch operation surface, and the pressure-sensitive sensor 106 detects a pressing force on the touch operation surface.

[3] Functional Configuration of Information Processing Apparatus

Figure 3:
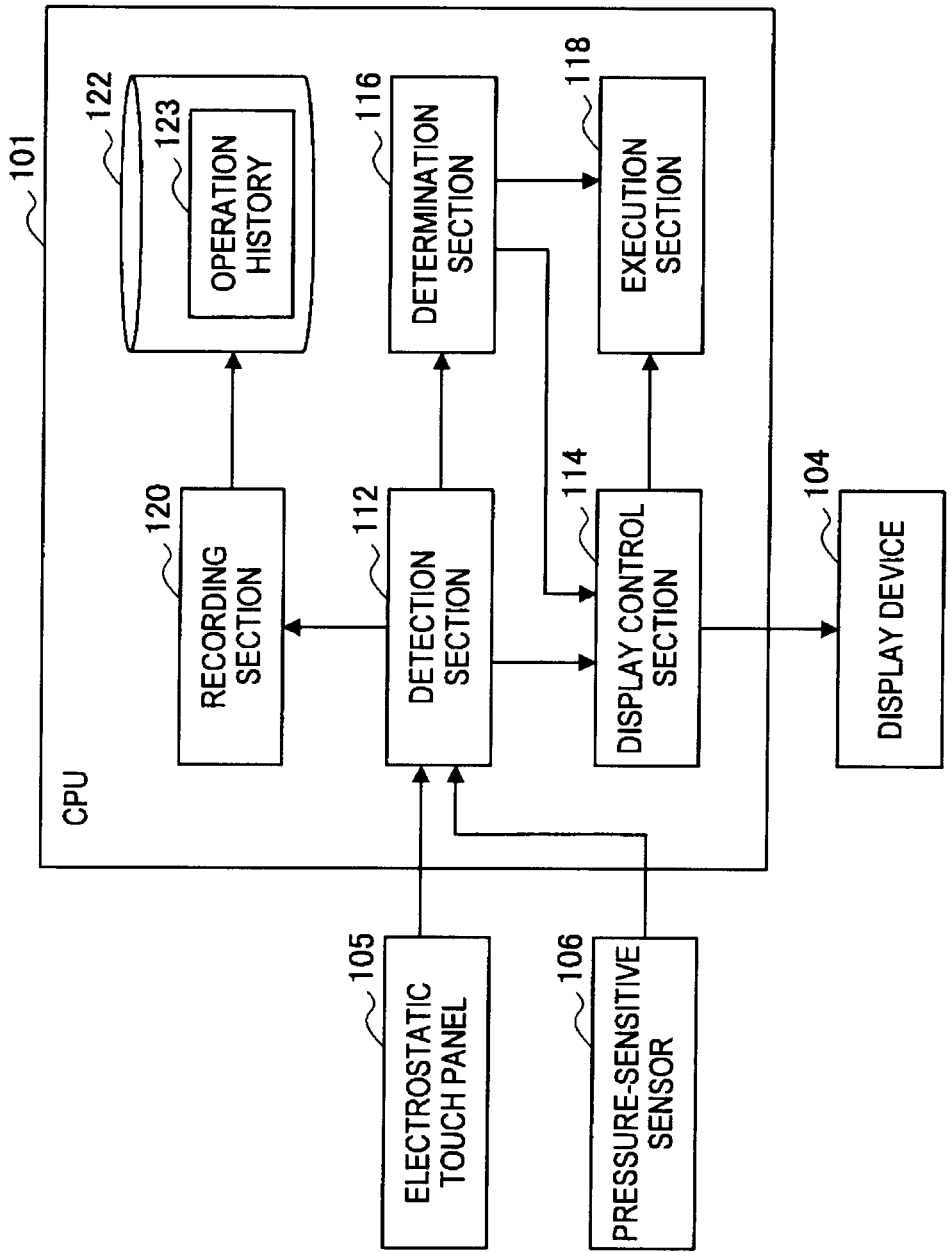
FIG. 3 is a block diagram showing a functional configuration of the information processing apparatus according to the embodiment.
Figure 4:
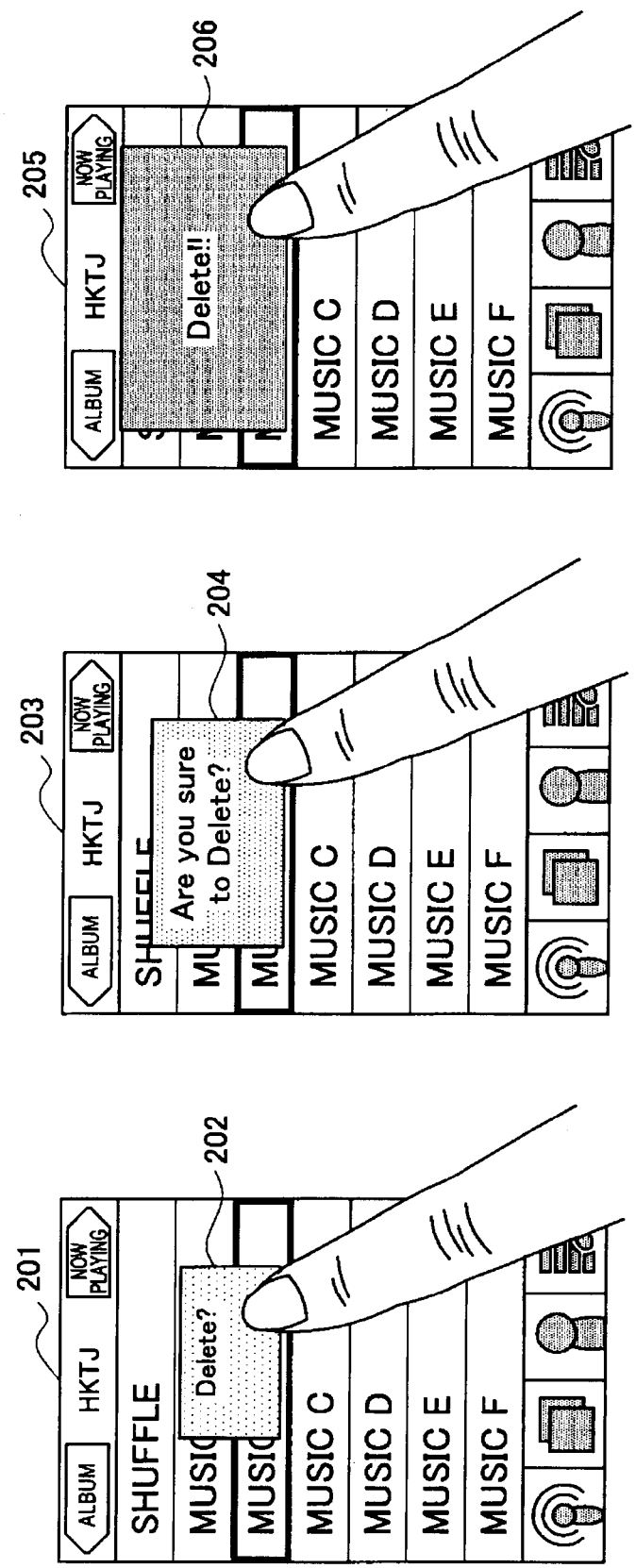
FIG. 4 is an explanatory view illustrating display examples of confirmation messages according to the embodiment.

In the above, the hardware configuration of the information processing apparatus 100 according to the present embodiment has been described. Next, with reference to FIG. 3, a functional configuration of the information processing apparatus 100 will be described. In FIG. 3, display control in the CPU 101 is particularly described. Note that the description will be made with references to FIG. 4 to FIG. 7 as appropriate in describing the functional configuration of the information processing apparatus 100 shown in FIG. 3. As shown in FIG. 4, the CPU 101 includes a detection section 112, a display control section 114, a determination section 116, an execution section 118, a recording section 120, a storage section 122, and the like.

The detection section 112 has a function of detecting touch operation on the touch operation surface (display screen) by the operating tool, which is input from the electrostatic touch panel 105. As described above, when the contact body touches the display screen, the electrostatic capacity detected by the electrostatic touch panel 105 increases. When the electrostatic capacity detected by the electrostatic touch panel 105 exceeds a predetermined amount, the detection section 112 can detect the contact of the operating tool to the display screen. The detection section 112 determines whether the operating tool touches the display screen, and in the case where it is determined that the operating tool touches the display screen, the detection section 112 provides the detected electrostatic capacity value as a detection result to the display control section 114 and the determination section 116.

Further, the detection section 112 has a function of detecting a pressing force applied by the operating tool to the touch operation surface. As described above, the pressure-sensitive sensor 106 detects an electric signal depending on the magnitude of the pressure. The detection section 112 determines whether the operating tool presses the display screen by using the electric signal detected by the pressure-sensitive sensor 106, and in the case where it is determined that the operating tool presses the display screen, the detection section 112 provides the detected pressing force as a detection result to the display control section 114 and the determination section 116.

The display control section 114 has a function of displaying a confirmation message for confirming whether to execute predetermined processing on the display screen. Here, as the predetermined processing, there can be exemplified irreversible processing such as data deletion, access processing to an unreliable Web site, and sending a mail to an invalid mail address. Further, as the confirmation message, there can be exemplified a message for confirming whether to perform data deletion at the time of deleting the displayed data. Further, there can also be exemplified a message for confirming, at the time of accessing an unreliable Web site or sending a mail to an invalid mail address, the access or the transmission.

Hereinafter, display examples of confirmation messages will be described with reference to FIG. 4. FIG. 4 is an explanatory view illustrating the display examples of the confirmation messages. As shown in FIG. 4, in the case of deleting music data, there is displayed "Delete?" for confirming whether it is OK to delete the data, as shown in a display example 201. Further, after there was a delete instruction by the user's operation, there is displayed "Are you sure to Delete?" for confirming whether it is really OK to delete the data.

When the operating tool touches an object to be deleted, the display control section 114 displays the confirmation message shown in the display example 201. In addition, in the case where the contact of the operating tool to the touch operation surface is maintained or the pressing force applied by the operating tool to the touch operation surface increases, the display control section 114 displays the confirmation message shown in a display example 203. Then, before deleting the data, the display control section 114 displays a message "Delete".

Further, the display control section 114 may change a display color of a position corresponding to a touched part of the touch operation surface depending on the pressing force applied by the operating tool to the touch operation surface. For example, as shown in FIG. 4, in the case where the display screen is pressed by the operating tool, confirmation messages 202, 204, and 206 are displayed on the display screen. Display forms such as the display color and the display size of a dialogue box containing the confirmation message varies depending on the pressing force applied by the operating tool.

For example, in the case where the pressing force is 3 N or less, the display color of the dialogue box containing the confirmation message 202 is blue. The display size of the dialogue box containing the confirmation message 202 is slightly larger than the size of the touched part of the contact body. Further, in the case where the pressing force is more than 3 N and 7 N or less, the display color of the dialogue box containing the confirmation message 204 is yellow. The display size of the dialogue box containing the confirmation message 204 is larger than the size of the dialogue box containing the confirmation message 202. Further, in the case where the pressing force is more than 7 N, the display color of the dialogue box containing the confirmation message 206 is red. The display size of the dialogue box containing the confirmation message 206 is larger than the size of the dialogue box containing the confirmation message 204.

By changing the display color and the display size of the dialogue box containing the confirmation message depending on the pressing force in the manner described above, it becomes possible to intuitively recognize the change of the pressing force applied by the operating tool. The user recognizes the display color and the display size of the dialogue box, which are given as feedback depending on the pressing force, and executes desired processing by pressing even harder the display screen or by releasing the contact body from the display screen. For example, in the case where the display screen is pressed even harder by the operating tool, the confirmation processing to the confirmation message is skipped, and the next confirmation message is displayed or designated processing is executed.

Figure 5:
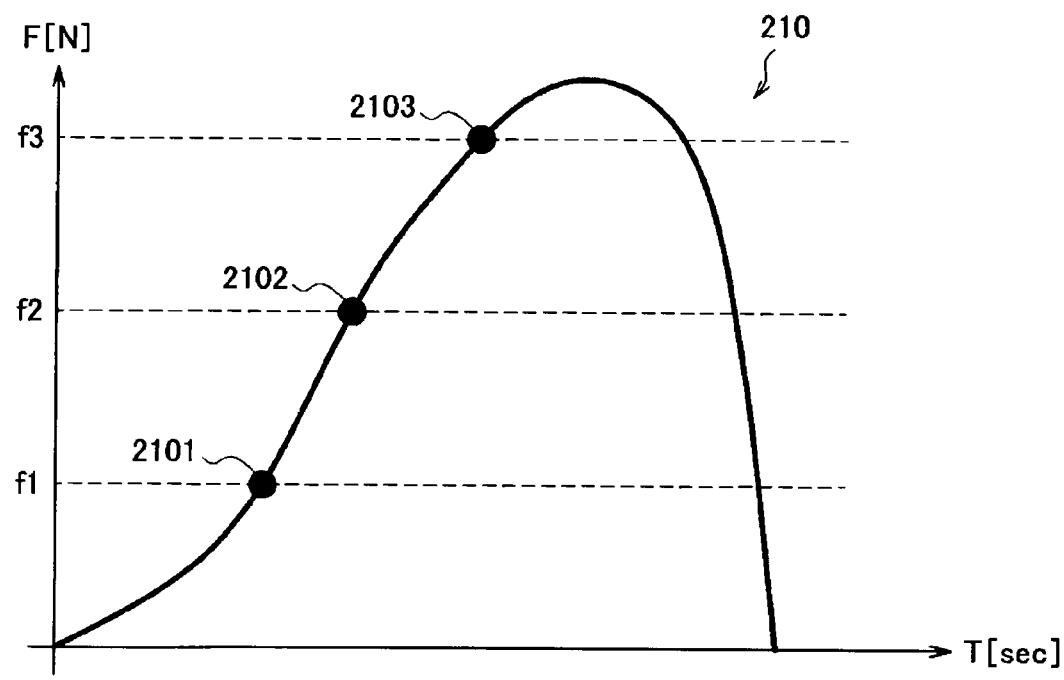
FIG. 5 is an explanatory view illustrating a relationship between a pressing force applied by an operating tool and the confirmation messages according to the embodiment.
Figure 6:
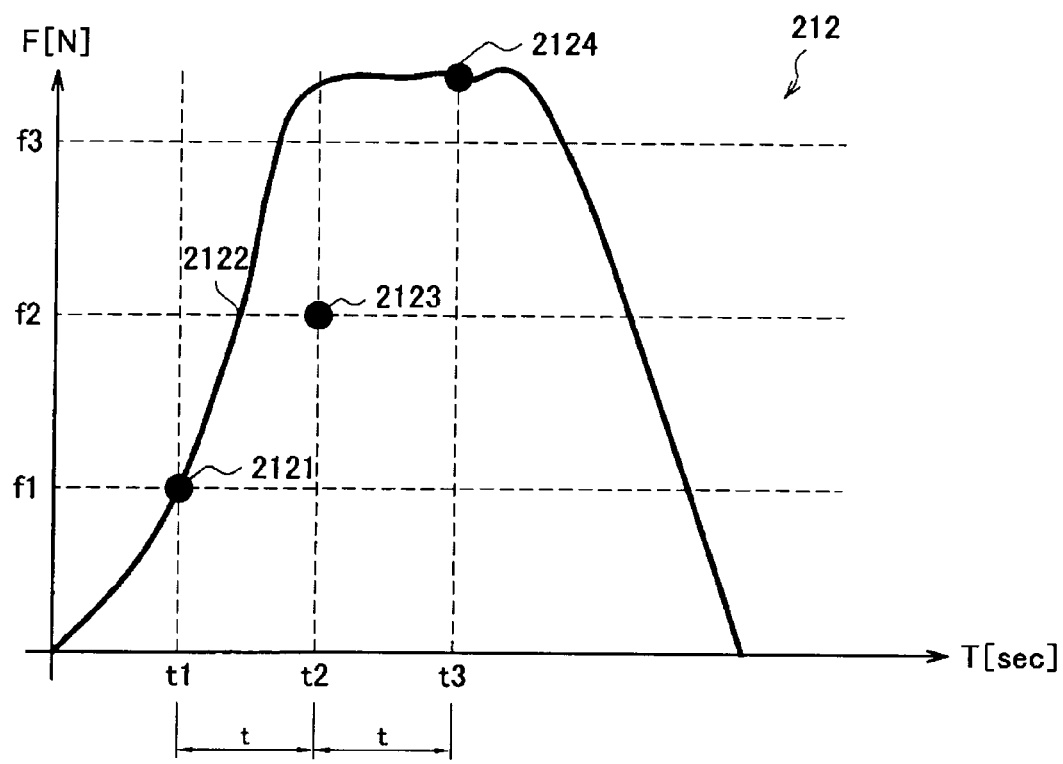
FIG. 6 is an explanatory view illustrating a relationship between the pressing force applied by the operating tool and the confirmation messages according to the embodiment.

Hereinafter, a relationship between the pressing force applied by the operating tool and the confirmation messages will be described with reference to FIG. 5 and FIG. 6. FIG. 5 and FIG. 6 are each an explanatory view illustrating the relationship between the pressing force applied by the operating tool and the confirmation messages. As shown in FIG. 5, a pressing force F[N] increases from 0 to f1, f2, and then to f3, and decreases after that. At a time point 2101 when the pressing force F[N] exceeds f1, the display control section 114 displays a first stage confirmation message. Then, at a time point 2102 when the pressing force F[N] exceeds f2, the display control section 114 displays a second stage confirmation message. In addition, at a time point 2103 when the pressing force F[N] exceeds f3, the execution section 118 executes predetermined processing. The predetermined processing performed by the execution section 118 will be described later. In the case where it is determined by the determination section 116 that the pressing force applied by the operating tool gradually increases, that is, in the case where it is determines that the pressing force gradually increases in a state of the operating tool being in contact with the touch operation surface, the display control section 114 displays the confirmation messages in a step-by-step manner depending on the pressing force.

Further, as shown in FIG. 6, even in the case where the pressing force of the operating tool is rapidly applied, the confirmation message may be displayed for a predetermined time period. In the case where the pressing force of the operating tool is rapidly applied, when the display of the confirmation message is switched immediately in response to the pressing force, the user may not be able to recognize the confirmation message. Accordingly, the display control section 114 causes the confirmation message to be displayed for the predetermined time period even in the case where the pressing force of the operating tool is rapidly applied. For example, in the case where the pressing force increases from f1 to f3, the display control section 114 displays the first stage confirmation message at a time point 2121 when the pressing force exceeds f1, and displays the second stage confirmation message at a time point 2122 when the pressing force exceeds f2.

However, the pressing force exceeds a threshold value f2 of the pressing force for displaying the second stage confirmation message immediately after exceeding a threshold value f1 of the pressing force for displaying the first stage confirmation message. In this case, the first stage confirmation message is displayed only for a short period of time and the user may not be able to recognize the confirmation message. Therefore, the next confirmation message is displayed or designated processing is executed after the elapse of time t from the display of the confirmation message.

As show in FIG. 6, at the time point 2122 when the pressing force exceeds f2, the time t is not elapsed from the display of the confirmation message. Consequently, the display control section 114 displays the second stage confirmation message at a time point 2123 when the time t elapses from the display of the first stage confirmation message. In addition, at a time point 2124 when the pressing force exceeds f3 and the time t elapses from the display of the second stage confirmation message, the execution section 118 executes designated processing.

Returning to FIG. 3, the description will be continued. The determination section 116 has a function of determining whether the contact of the operating tool to the touch operation surface is maintained. The determination section 116 determines whether the contact is maintained based on a detection result of the touch operation by the operating tool detected by the detection section 112. Further as described above, in the case where the pressing force is detected by the detection section 112, the determination section 116 determines, in addition to whether the contact of the operating tool to the touch operation surface is maintained, whether the pressing force applied by the operating tool to the touch operation surface increases. The determination section 116 provides the determined results to the display control section 114 and the execution section 118.

In the case where the determination section 116 determines that the contact of the operating tool to the touch operation surface is maintained, the execution section 118 has a function of executing predetermined processing designated by the touch operation even without explicit confirmation processing being performed with respect to a confirmation message. Further, in the case where the determination section 116 determines that the contact of the operating tool to the touch operation surface is maintained, and that the pressing force applied by the operating tool to the touch operation surface increases, the execution section 118 may execute the designated predetermined processing even without explicit confirmation processing being performed with respect to the confirmation message.

As described above, in related art, in the case where a confirmation message is displayed, designated processing is not executed unless explicit confirmation processing with respect to the confirmation message is performed. However, in the present embodiment, when the contact of the operating tool to the touch operation surface is maintained or the pressing force applied by the operating tool to the touch operation surface increases, the confirmation processing after the display of the confirmation message can be skipped and the designated processing can be executed. Therefore, it becomes possible for the user to execute the designated processing without touching the screen multiple times or selecting a displayed button multiple times, but only by continuously touching or continuously harder pressing the touch operation surface.

Further, as described above, the execution section 118 may execute the predetermined processing in the case where, after the display control section 114 displays a confirmation message for a predetermined time period or more, the pressing force applied by the operating tool increases and the pressing force becomes equal to or more than a threshold value. Further, in the case where multiple confirmation messages are displayed by the display control section 114 in a step-by-step manner, the execution section 118 executes, when the pressing force applied by the operating tool increases after the confirmation messages are sequentially displayed, the predetermined processing without explicit confirmation processing being performed with respect to a confirmation message.

Further, during the sequential display of the confirmation messages performed by the display control section 114, in the case where the operating tool is released from the touch operation surface or the pressing force decreases, the execution section 118 does not execute the designated processing. In the case where the operating tool is released from the touch operation surface or the pressing force decreases, the display control section 114 hides a confirmation message or displays a confirmation message which has been displayed before.

Further, the display control section 114 may display a final confirmation message of whether to execute the predetermined processing before executing the predetermined processing. The final confirmation message refers to, for example, in the case where multiple confirmation messages are displayed, the last confirmation message of the confirmation messages which are displayed by the display control section 114 in a step-by-step manner. In the case where the confirmation messages are displayed by the display control section 114, the display control section 114 sequentially displays the confirmation messages up to the final confirmation message even without confirmation processing being performed with respect to the confirmation messages. Accordingly, it becomes possible to skip the confirmation processing to the multiple messages and to execute designated processing only by the confirmation processing with respect to the final confirmation message.

The recording section 120 has a function of, in the case where confirmation processing with respect to the confirmation message is executed in accordance with the operation of the operating tool, recording the confirmation processing. The recording section 120 records the confirmation processing, as an operation history 123, in the storage section 122. The storage section 122 corresponds to the non-volatile memory 103 in FIG. 2, and stores each of various types of processing with an operation history, the operation being associated with the operation history. As described above, the various types of processing includes processing for deleting data, processing for sending a mail, processing for accessing a Web site, and the like. In addition, operation histories are recorded for every data to be deleted, mail addresses to which the mail are to be sent, and Web sites to be accessed.

The determination section 116 determines, in the case where the confirmation message is displayed by the display control section 114, whether the confirmation processing with respect to the confirmation message is recorded in the operation history 123. Then, in the case where the determination section 116 determines that an operation history of the corresponding confirmation processing is stored in the operation history 123, the execution section 118 executes predetermined processing designated by the touch operation even without explicit confirmation processing being performed with respect to the confirmation message.

For example, in the case of accessing an unreliable Web site, a certificate held by the Web site is necessitated. Therefore, in the case of accessing an unreliable Web site, a confirmation message (warning message) asking whether to access the Web site is displayed although there is no certificate, and hence, confirmation processing by the user is necessitated. In this case, however, when the user returns to a Web site which the user has once accessed, the warning message is displayed whenever the user accesses the Web site, and it is an unnecessary burden imposed on the user to perform the confirmation processing. In the present embodiment, the confirmation processing with respect to the confirmation message that has been once performed is recorded as the operation history, and hence, it becomes possible to skip the confirmation processing in the case where the same confirmation message is displayed again, and to display the next confirmation message or to execute processing.

Figure 7:
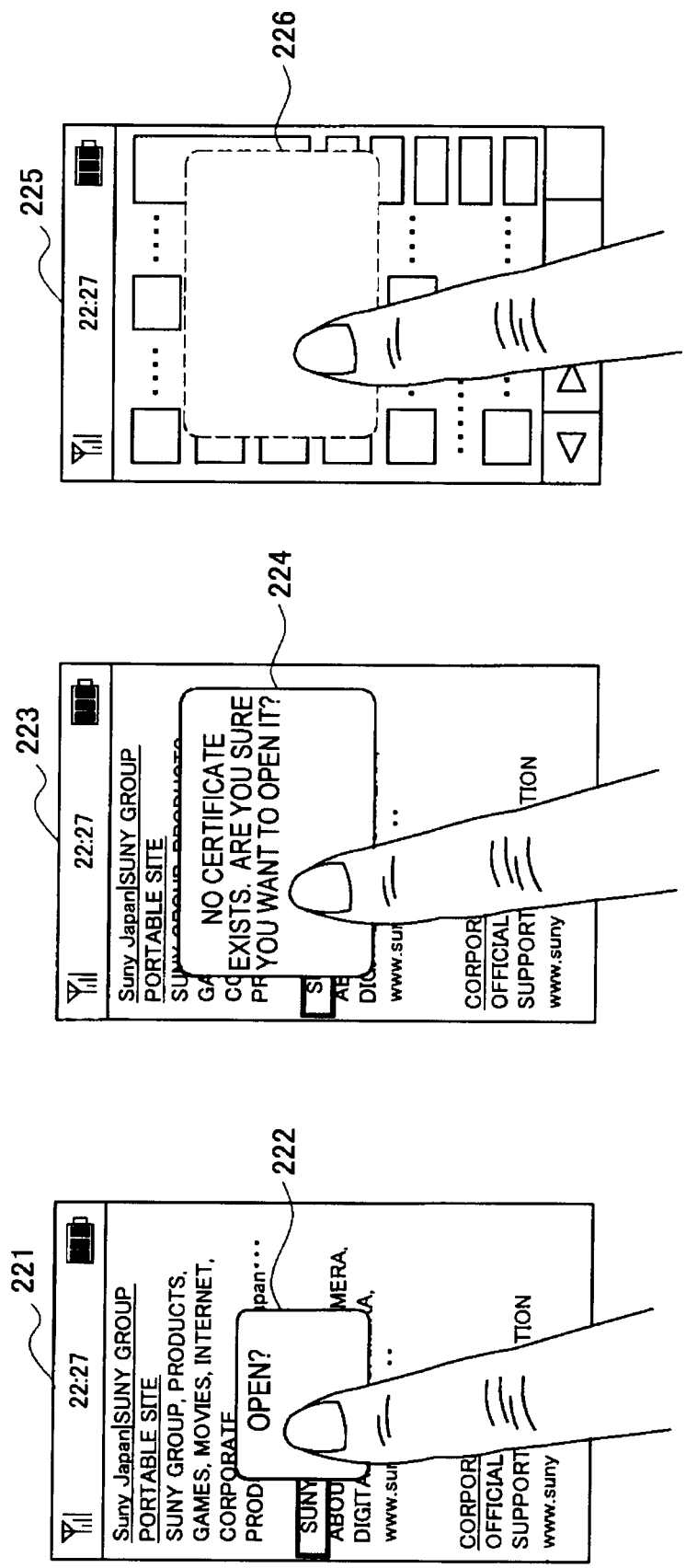
FIG. 7 is an explanatory view illustrating a skip of confirmation processing according to the embodiment.

Hereinafter, a skip of confirmation processing will be described with reference to FIG. 7. FIG. 7 is an explanatory view illustrating the skip of the confirmation processing. As shown in FIG. 7, first, in the case where the operating tool touches a touch operation surface 221, a dialogue box 222 containing a confirmation message "Open?" is displayed. As described above, the display color of the dialogue box 222 and the display size of the dialogue box 222 are determined depending on a pressing force applied by a contact body which is in contact with the touch operation surface 221. The display color of the dialogue box 222 is blue and the display size thereof is slightly larger than the size of the touched part of the contact body.

In the case where the operating tool remains in contact with the touch operation surface and the pressing force applied by the operating tool to the touch operation surface increases, the confirmation processing with respect to the confirmation message 222 is skipped, and a dialogue box 224 containing a confirmation message "No certificate exists. Are you sure you want to open it?" is displayed. The pressing force on a touch operation surface 223 is larger than the pressing force on the touch operation surface 222, and hence, the display color of the dialogue box 224 is changed to yellow. The display size of the dialogue box 224 is changed to a size larger than the display size of the dialogue box 222.

Still further, in the case where the operating tool remains in contact with the touch operation surface and the pressing force applied by the operating tool to the touch operation surface increases, the confirmation processing with respect to the confirmation message 224 is skipped, and access processing to a Web site is executed. At that time, the display control section 114 hides a dialogue box 226. Assuming that the Web site is the one which the user often views, and in the case where the user has performed confirmation processing with respect to the confirmation message once and then returns to the Web site again, the user can skip the confirmation processing with respect to the confirmation message and can access the Web site by remaining in contact with the touch operation surface and pressing even harder the touch operation surface.

[4] Detail of Operation of Information Processing Apparatus

Figure 8:
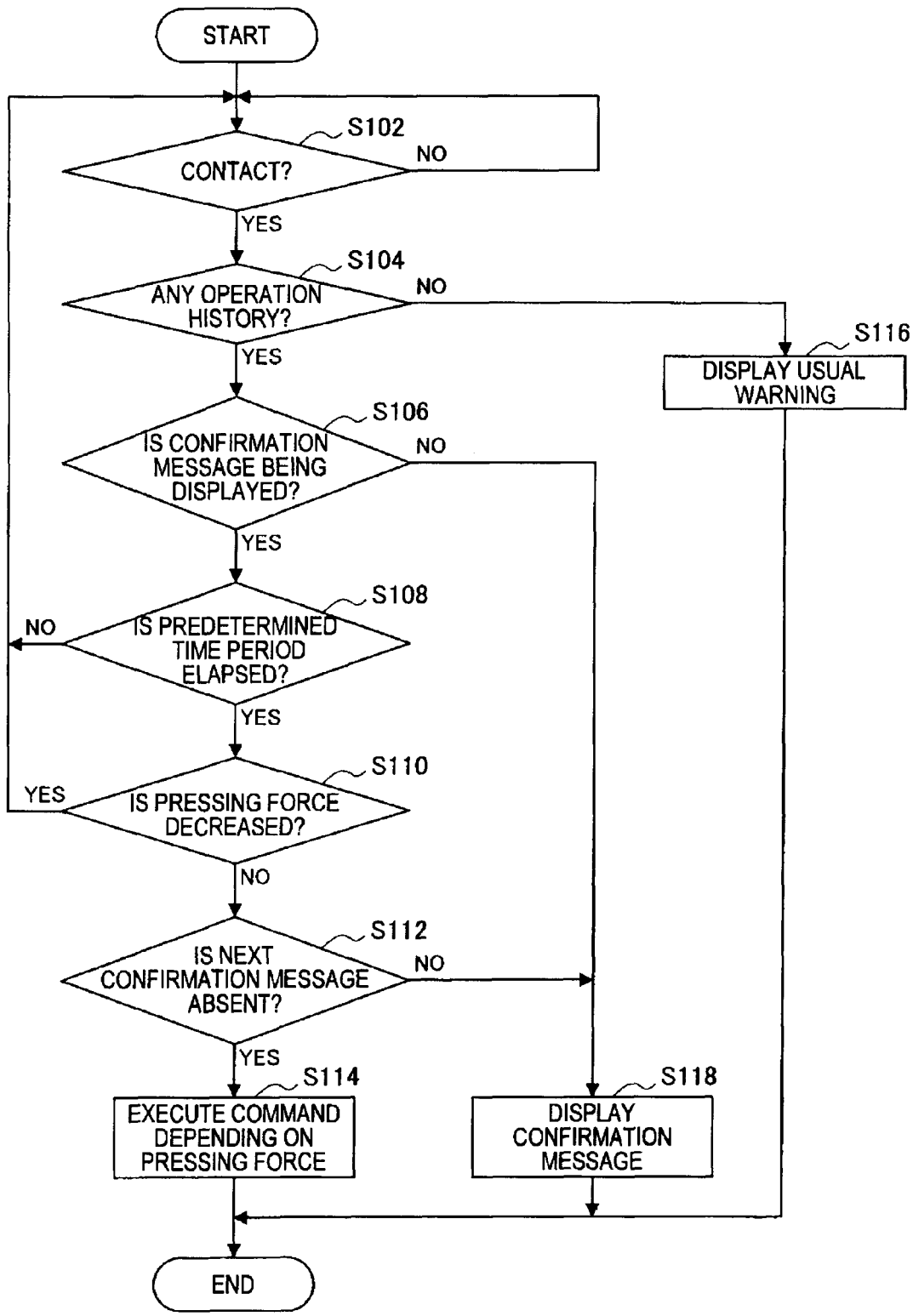
FIG. 8 is a flowchart showing a detail of operation of the information processing apparatus according to the embodiment.

In the above, the functional configuration of the information processing apparatus 100 has been described. Next, with reference to FIG. 8, a detail of operation of the information processing apparatus 100 will be described. FIG. 8 is a flowchart showing the detail of operation of the information processing apparatus 100. As shown in FIG. 8, first, the detection section 112 determines whether the operating tool touches the touch operation surface (display screen) (S102). Then, the determination section 116 determines whether an operation history 123 with respect to a confirmation message displayed by the display control section 114 is recorded in the storage section 122 (S104).

In Step S104, in the case where it is determined that there is an operation history, the processing of Step S106 is executed. On the other hand, in Step S104, in the case where it is determined that there is no operation history, a usual warning display is performed (S116). The usual warning display in Step S116 refers to a display of a confirmation message with respect to processing designated by the operating tool which touched the touch operation surface in Step S102. For example, in the case where there is a data deletion instruction, a message for confirming whether it is OK to delete the data is displayed, and the confirmation processing by the user's operation is encouraged.

Further, in the flowchart of FIG. 8, in Step S104, in the case where it is determined that there is no operation history 123, it is necessary that the confirmation processing with respect to the confirmation message be executed as usual, but is not limited thereto. For example, even in the case where the operation history 123 is not recorded in the storage section 122, the confirmation processing may be skipped depending on the pressing force applied by the operating tool. For example, as for the processing other than data deletion or billing process, in which the necessity to warn the user and to perform the confirmation processing is low, the confirmation processing may be skipped even when an operation history thereof is not stored.

Next, the determination section 116 determines whether a confirmation message is being displayed on the display screen (S106). For example, when the operating tool touches the display screen, there is displayed a dialogue box containing a confirmation message such as "Delete?" for confirming whether to delete data or "Open?" for confirming whether to open a Web site. In Step S106, in the case where it is determined that a confirmation message is being displayed, it is further determined whether a predetermined time period is elapsed from the display of the confirmation message (S108). In Step S106, in the case where it is determined that the confirmation message is not being displayed, a confirmation message to be displayed is displayed (S118).

For example, in the case where a confirmation message is to be displayed during the time period in which the operating tool is in contact with the display screen, it may be determined, in Step S108, whether the contact of the operating tool to the touch operation surface is maintained. In Step S108, in the case where the predetermined time period is not elapsed from the display of the confirmation message, the processing of Step S102 is repeated. In Step S108, in the case where the predetermined time period is elapsed from the display of the confirmation message, processing of Step S110 is executed.

In Step S108, the case where the predetermined time period is not elapsed from the display of the confirmation message refers to a case where the operating tool is released from the touch operation surface and the confirmation message is hidden. In the case where the confirmation message is hidden within the predetermined time period, the processing returns to Step S102. In Step S108, in the case where it is determined that the predetermined time period is elapsed from the display of the confirmation message, it is determined whether a pressing force is decreased (S110).

In Step S108, the case where the predetermined time period is elapsed from the display of the confirmation message refers to a case where the contact of the operating tool to the touch operation surface is maintained. In Step S108, in the case where the contact of the operating tool to the touch operation surface is maintained, it is determined, in Step S110, whether the pressing force applied by the operating tool is decreased. In Step S110, in the case where it is determined that the pressing force applied by the operating tool is decreased, the processing returns to Step S102.

In Step S110, in the case where it is determined that the pressing force applied by the operating tool is not decreased, it is determined whether a confirmation message to be displayed next is absent (S112). In Step S112, in the case where it is determined that the confirmation message to be displayed next is absent, a command for executing designated processing depending on the pressing force applied by the operating tool is executed (S114). In Step S112, in the case where it is determined that the confirmation message to be displayed next is not absent, the confirmation message to be displayed next is displayed.

In Step S114, after displaying the confirmation message, the confirmation processing is skipped and the command is executed. Further, in the case where the processing of Step S118 is performed after the determination in Step S112, the confirmation processing is skipped and the confirmation message to be displayed next is displayed.

As described above, in the case where it is determined that the contact of the operating tool is maintained in Step S108 and that the pressing force applied by the operating tool is not decreased in Step S110 but the pressing force is not increased in Step S114, the command may not be executed. Further, in Step S114, different commands may be executed depending on pressing forces. In the above, the detail of operation of the information processing apparatus 100 has been described.

According to the embodiment, in the case where the touch operation by the operating tool which operates the display screen is detected and the contact of the operating tool to the touch operation surface is maintained, predetermined processing designated by the touch operation is executed without confirmation processing being performed with respect to a displayed confirmation message. Consequently, the explicit confirmation processing with respect to the confirmation message can be skipped and the predetermined processing can be executed.

Further, by displaying a confirmation message to be displayed next and executing predetermined processing designated after the display of multiple confirmation messages depending on the pressing force applied by the operating tool, it becomes possible to, while displaying warnings in multiple stages, skip confirmation processing and lessen the burden imposed on the user's operation.

Further, the confirmation processing is skipped not by gesture operation such as double tapping, but by the contact time and pressing force applied by the operating tool, and hence, it becomes possible to expand the operability without interfering with existing operation. In addition, intuitive operation can be realized by giving feedback to the user, such as changes in the display colors depending on the pressing force.

It should be understood by those skilled in the art that various modifications, combinations, sub-combinations and alterations may occur depending on design requirements and other factors insofar as they are within the scope of the appended claims or the equivalents thereof.

For example, respective steps included in the processing of the information processing apparatus 100 according to the present specification are not necessarily processed in chronological order in accordance with the flowchart. That is, the respective steps included in the processing of the information processing apparatus 100 may be different processing or may be executed in a parallel manner.

Further, it is also possible to create a computer program for causing hardware such as a CPU, a ROM, and a RAM built in the information processing apparatus 100 to realize a function equivalent to the function of each configuration of the information processing apparatus 100. Further, there is also provided a storage medium in which the computer program is stored.

The present application contains subject matter related to that disclosed in Japanese Priority Patent Application JP 2009-200871 filed in the Japan Patent Office on Aug. 31, 2009, the entire content of which is hereby incorporated by reference.

What is claimed is:

1. An information processing apparatus comprising:
a detection section which detects touch operation on a touch operation surface by an operating tool;
a determination section which determines whether contact of the operating tool to the touch operation surface is maintained;

a display control section which causes a confirmation message, for confirming whether to execute a predetermined processing, to be displayed depending on a determination result of the determination section;

a recording section for recording a confirmation processing with respect to the confirmation message, wherein the confirmation processing is executed in accordance with the operation of the operating tool, and the predetermined processing is executed as result of the confirmation processing: and an execution section which executes the predetermined processing designated by the confirmation processing, wherein, when the determination section determines that the contact of the operating tool to the touch operation surface is maintained, and determines that the confirmation processing with respect to the confirmation message is previously recorded by the recording section, the execution section executes the predetermined processing designated by the recorded confirmation processing even without explicit confirmation processing being performed with respect to the confirmation message, wherein the detection section detects a pressing force applied by the operating tool to the touch operation surface, wherein the determination section determines whether the contact of the operating tool to the touch operation surface is maintained and whether the pressing force applied by the operating tool to the touch operation surface increases, wherein, when the determination section determines that the contact of the operating tool to the touch operation surface is maintained and that the pressing force applied by the operating tool to the touch operation surface increases, the execution section executes the predetermined processing designated by the confirmation processing even without explicit confirmation processing being performed with respect to the confirmation message, wherein the display control section causes a plurality of confirmation messages, for confirming whether to execute the predetermined processing, to be displayed on a display screen in a step-by-step manner before the predetermined processing is executed by the execution section, wherein the confirmation processing recorded by the recording section comprises a sequence of a plurality of confirmation processing with respect to the plurality of confirmation messages, and wherein when the determination section determines that the contact of the operating tool to the touch operation surface is maintained and that the pressing force applied by the operating tool to the touch operation surface increases and becomes equal to or more than a predetermined threshold value, and determines that the confirmation processing with respect to the confirmation message is previously recorded, the display control section causes the plurality of confirmation messages to be displayed sequentially on the display screen depending on the pressing force even without the explicit confirmation processing being performed with respect to the plurality of confirmation messages.

2. The information processing apparatus according to claim 1, wherein, when the determination section determines that the contact of the operating tool to the touch operation surface is maintained and that the pressing force applied by the operating tool to the touch operation surface becomes equal to or more than a predetermined threshold value, the display control section causes a confirmation message depending on the pressing force to be displayed.

3. The information processing apparatus according to claim 1, wherein the determination section determines whether a predetermined time period is elapsed from the display of the confirmation message performed by the display control section, and wherein, when the determination section determines that the predetermined time period is elapsed from the display of the confirmation message, that the contact of the operating tool to the touch operation surface is maintained, and that the pressing force applied by the operating tool to the touch operation surface becomes equal to or more than a predetermined threshold value, the execution section executes the predetermined processing designated by the confirmation processing without explicit confirmation processing being performed with respect to the confirmation message.

4. The information processing apparatus according to claim 1, wherein, after the plurality of confirmation messages are sequentially displayed by the display control section, the execution section executes the predetermined processing designated by the confirmation processing even without explicit confirmation processing being performed with respect to the plurality of confirmation messages.

5. The information processing apparatus according to claim 1, wherein, before the execution section executes the predetermined processing, the display control section causes a final confirmation message of whether to execute the predetermined processing to be displayed, and wherein, after the final confirmation message is displayed, the execution section executes the predetermined processing designated by the touch operation depending on the pressing force applied by the operating tool.

6. The information processing apparatus according to claim 1, wherein the display control section changes display forms including a display color and a display size of the confirmation message depending on the pressing force applied by the operating tool.

7. The information processing apparatus according to claim 1, wherein the execution section executes output processing including an audio output and a vibration output along with the display of the confirmation message performed by the display control section, depending on the pressing force applied by the operating tool.

8. A non-transitory, computer-readable medium storing a program for causing a computer to function as an information processing apparatus comprising: a detection section which detects touch operation on a touch operation surface by an operating tool, a determination section which determines whether contact of the operating tool to the touch operation surface is maintained, a display control section which causes a confirmation message, for confirming whether to execute the predetermined processing, to be displayed depending on a determination result of the determination section, a recording section for recording a confirmation processing with respect to the confirmation message, wherein the confirmation processing is executed in accordance with the operation of the operating tool, and the predetermined processing is executed as a result of the confirmation processing, and an execution section which executes the predetermined processing designated by the confirmation processing, wherein, when the determination section determines that the contact of the operating tool to the touch operation surface is maintained, and determines that the confirmation processing with respect to the confirmation message is previously recorded by the recording section, the execution section executes the predetermined processing designated by the recorded confirmation processing even without explicit confirmation processing being performed with respect to the confirmation message, wherein the detection section detects a pressing force applied by the operating tool to the touch operation surface, wherein the determination section determines whether the contact of the operating tool to the touch operation surface is maintained and whether the pressing force applied by the operating tool to the touch operation surface increases, wherein, when the determination section determines that the contact of the operating tool to the touch operation surface is maintained and that the pressing force applied by the operating tool to the touch operation surface increases, the execution section executes the predetermined processing designated by the confirmation processing even without explicit confirmation processing being performed with respect to the confirmation message, wherein the display control section causes a plurality of confirmation messages, for confirming whether to execute the predetermined processing, to be displayed on a display screen in a step-by-step manner before the predetermined processing is executed by the execution section, wherein the confirmation processing recorded by the recording section comprises a sequence of a plurality of confirmation processing with respect to the plurality of confirmation messages, and wherein when the determination section determines that the contact of the operating tool to the touch operation surface is maintained and that the pressing force applied by the operating tool to the touch operation surface increases and becomes equal to or more than a predetermined threshold value, and determines that the confirmation processing with respect to the confirmation message is previously recorded, the display control section causes the plurality of confirmation messages to be displayed sequentially on the display screen depending on the pressing force even without the explicit confirmation processing being performed with respect to the plurality of confirmation messages.

9. The non-transitory, computer-readable medium according to claim 8, wherein, when the determination section determines that the contact of the operating tool to the touch operation surface is maintained and that the pressing force applied by the operating tool to the touch operation surface becomes equal to or more than a predetermined threshold value, the display control section causes a confirmation message depending on the pressing force to be displayed.

10. The non-transitory, computer-readable medium according to claim 8, wherein the determination section determines whether a predetermined time period is elapsed from the display of the confirmation message performed by the display control section, and wherein, when the determination section determines that the predetermined time period is elapsed from the display of the confirmation message, that the contact of the operating tool to the touch operation surface is maintained, and that the pressing force applied by the operating tool to the touch operation surface becomes equal to or more than a predetermined threshold value, the execution section executes the predetermined processing designated by the confirmation processing without explicit confirmation processing being performed with respect to the confirmation message.

11. The non-transitory, computer-readable medium according to claim 8, wherein, after the plurality of confirmation messages are sequentially displayed by the display control section, the execution section executes the predetermined processing designated by the confirmation processing even without explicit confirmation processing being performed with respect to the plurality of confirmation messages.

12. The non-transitory, computer-readable medium according to claim 8, wherein, before the execution section executes the predetermined processing, the display control section causes a final confirmation message of whether to execute the predetermined processing to be displayed, and wherein, after the final confirmation message is displayed, the execution section executes the predetermined processing designated by the touch operation depending on the pressing force applied by the operating tool.

13. The non-transitory, computer-readable medium according to claim 8, wherein, the display control section changes display forms including a display color and a display size of the confirmation message depending on the pressing force applied by the operating tool.

14. The non-transitory, computer-readable medium according to claim 8, wherein the execution section executes output processing including an audio output and a vibration output along with the display of the confirmation message performed by the display control section, depending on the pressing force applied by the operating tool.

* * * * *